(12) United States Patent
Haber et al.

(10) Patent No.: US 7,036,116 B2
(45) Date of Patent: Apr. 25, 2006

(54) PERCOLATING HOT FUNCTION STORE/RESTORES TO COLDER CALLING FUNCTIONS

(75) Inventors: Gad Haber, Nesher (IL); Moshe Klausner, Rramat Yishai (IL); Vadim Eisenberg, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 639 days.

(21) Appl. No.: 10/097,063

(22) Filed: Mar. 14, 2002

(65) Prior Publication Data

US 2004/0015927 A1 Jan. 22, 2004

Related U.S. Application Data

(60) Provisional application No. 60/278,487, filed on Mar. 23, 2001.

(51) Int. Cl.
G06F 9/45 (2006.01)
(52) U.S. Cl. .................. 717/151; 717/158; 717/159
(58) Field of Classification Search ......... 717/136–167
See application file for complete search history.

(56) References Cited

U.S. PATENT DOCUMENTS

| | | | | |
|---|---|---|---|---|
| 5,828,886 A | * | 10/1998 | Hayashi | 717/159 |
| 5,850,553 A | * | 12/1998 | Schlansker et al. | 717/155 |
| 6,029,004 A | * | 2/2000 | Bortnikov et al. | 717/158 |
| 6,070,009 A | * | 5/2000 | Dean et al. | 717/130 |
| 6,072,952 A | * | 6/2000 | Janakiraman | 717/155 |
| 6,128,775 A | * | 10/2000 | Chow et al. | 717/156 |
| 6,175,957 B1 | * | 1/2001 | Ju et al. | 717/156 |
| 6,324,683 B1 | * | 11/2001 | Fuh et al. | 717/124 |
| 6,539,543 B1 | * | 3/2003 | Guffens et al. | 717/161 |
| 6,588,009 B1 | * | 7/2003 | Guffens et al. | 717/161 |
| 6,826,748 B1 | * | 11/2004 | Hohensee et al. | 717/130 |
| 2002/0066090 A1 | * | 5/2002 | Babaian et al. | 717/156 |
| 2002/0112228 A1 | * | 8/2002 | Granston et al. | 717/155 |

OTHER PUBLICATIONS

T. Ball et al., Optimally Profiling and Tracing Programs, Jul. 1994, ACM Transactions on Programming Languages and Systems, vol. 16, No. 4, pp. 1319-1360.*
R.J. Hall, Call Path Profiling, May 1992, ACM 0-89791-504-6, pp. 296-306.*
Robert Cohn et al, "Spike: An optimizer for Alpha/NT Executables" Published in the Proceedings of the USENIX Windows NT Workshop, Seattle, Washington, Aug. 11-13, 1997 [online] [Retrieved on Oct. 25, 2000]. Retrieved from the internet <URL: http//www.usenix.org/publications/...utl_papers/cohn/cohn_html/cohn.html>.

(Continued)

*Primary Examiner*—Chameli C. Das
*Assistant Examiner*—Andre R Fowlkes
(74) *Attorney, Agent, or Firm*—Browdy and Neimark, PLLC

(57) ABSTRACT

A method for post-link code optimization by identifying cold caller functions of a hot callee function, and percolating store and restore instructions with respect to non-volatile registers from the callee function to the caller function.

60 Claims, 3 Drawing Sheets

OTHER PUBLICATIONS

Robert Cohn et al, "Optimizing Alpha Executables on Windows NT with Spike", Digital Technical Journal, vol. 9, No. 4, pp. 3-20, 1997.

Robert Cohn et al, "Hot Cold Optimization of Large Windows/NT Applications" Published in Proceedings of Micro 29, Dec. 2, 1996 Research Triangle Park, North California.

Milo Martin, et al "Exploiting Dead Value Information", Published in Proceedings of Micro-30, Dec. 1-3, 1997, Research Triangle Park, North California, pp. 1-11.

Gadi Haber et al, "Reliable Post-link Optimizations Based on Partial Information", Proceedings of Feedback Directed and Dynamic Optimizations Workshop 3, Dec. 2000, Monterey, California, pp. 91-100.

Ealan Henis et al, "Feedback Based Post-link Optimization for Large Subsystems", Second Workshop on Feedback Directed Optimization, Nov. 1999, Haifa, Israel, pp. 13-20.

W.J. Schmidt et al, "Profile-directed Restructuring of Operating System Code", IBM Systems Journal, vol. 37, No. 2, 1998, pp. 270-297.

Robert Muth et al "Alto: A Link-Time Optimizer for the Compaq Alpha" [online] Nov. 2, 1999. Retrieved from Internet <http://www.cs.Arizona.edu/alto>.

U.S. Appl. No. 60/278,487, entitled "A Method For Optimizing Post-Link Code By Eliminating Store/Restore Instructions Of Non-Volatile Registers In Functions Prologs/Epilogs Using Non-Used Volatile Registers", filed Mar. 23, 2001.

U.S. Appl. No. 09/798,897, entitled "Optimizing Post-Link Code", filed Mar. 2, 2001.

* cited by examiner

PERCOLATING HOT FUNCTION STORE/RESTORES TO COLDER CALLING FUNCTIONS

CROSS-REFERENCE TO RELATED APPLICATIONS

This application claims the benefit of U.S. Provisional Patent Application No. 60/278,487, filed Mar. 23, 2001. It is also related to co-pending U.S. patent application Ser. No. 09/798,879, filed Mar. 2, 2001, and to a U.S. patent application entitled, "Eliminating Cold Register Store/Restores Within Hot Function Prolog/Epilogs," and another U.S. patent application entitled "Eliminating Store/Restores within Hot Function Prolog/Epilogs using Volatile Registers," both filed on even date. All of these applications are assigned to the assignee of the present patent application, and their disclosures are incorporated herein by reference.

FIELD OF THE INVENTION

The present invention relates generally to optimization of computer code to achieve faster execution, and specifically to optimizing object code following compilation and linking of the code.

BACKGROUND OF THE INVENTION

Post-link code optimizers generally perform global analysis on the entire executable code, including statically-linked library code. Since the executable code will not be re-compiled or re-linked, the post-link optimizer need not preserve compiler and linker conventions. It can thus perform aggressive optimizations across compilation units, in ways that are not available to optimizing compilers. Additionally, a post-link optimizer does not require the source code to enable its optimizations, allowing optimization of legacy code and libraries where no source code is available.

At the same time, post-link optimizers must deal with difficulties that are not encountered in compile-time optimization. Optimizing compilers operate on input in the form of high-level language description, typically source code, whose semantics are clearly defined. By contrast, static post-link optimization tools receive as their input low-level executable instructions (object code). The post-link optimizer must first attempt to disassemble the object code in order to identify the data and instructions contained in the code. Even after disassembly, the semantics of executable code given to a post-link optimizer may be only partially known, for the following reasons:

- Code instructions and data within an executable object are intermingled, making it impossible in some cases to distinguish between the two. Typically, there are code areas that cannot be classified unequivocally by the optimizer as either data or code instructions. In the context of the present patent application, these areas are referred to as "non-classified code areas."
- Even for fully-classified code areas that are known to contain code instructions, the semantics of the program cannot always be determined. Machine instructions operate on registers, which may contain either data information or memory locations. Therefore, the optimizer may be uncertain as to whether a given instruction performs a pure data computation, or whether it calculates an address to be used later in the program to retrieve/store data or to perform a control transfer within the program code.
- Data elements and their types, such as arrays, structures or scalars, can be identified only in a high-level language, such as C, C++, Pascal, etc. In post-link code, these elements appear as arbitrary data areas, and references to them are treated as arbitrary addresses. Therefore, at the post-link level, references to data elements cannot be fully resolved.

Because of these factors, the code semantics of the program may never be fully extracted from post-link code, and some of the dependencies between the data and code elements used by the program may remain uncertain.

Haber et al. describe an approach for dealing with these difficulties in an article entitled, "Reliable Post-Link Optimizations Based on Partial Information," in *Proceedings of Feedback Directed and Dynamic Optimizations Workshop* 3 (Monterey, Calif., December, 2000), pages 91–100, which is incorporated herein by reference. First, the program to be optimized is disassembled into basic blocks, by incrementally following all control flow paths that can be resolved in the program. The basic blocks are marked as either code, data or unclassified (not fully analyzed). Code blocks are further flagged according to their control flow properties. Partially analyzed areas of the program are delimited so as to contain the unclassified blocks, while relieving the rest of the program of the limitations that these blocks impose on optimization. The partially analyzed areas are chosen so that even when they cannot be internally optimized, they can still be repositioned safely en bloc to allow reordering and optimization of the code as a whole.

Use of post-link runtime profiling as a tool for optimization and restructuring is described by Henis et al., in "Feedback Based Post-Link Optimization for Large Subsystems," *Second Workshop on Feedback Directed Optimization* (Haifa, Israel, November, 1999), pages 13–20; and by Schmidt et al., in "Profile-Directed Restructuring of Operating System Code," *IBM Systems Journal* 37:2 (1998), pages 270–297. These publications are incorporated herein by reference.

Runtime profiling of the program creates a log recording usage statistics of each code block in two stages. First, in an instrumentation stage, each basic block is modified with either a new header or footer, wherein the added code increments a counter every time that basic block is run. In the second stage (the execution stage), the modified program is executed. At the end of the execution, the counters are written into a log file. Statistical analysis of the frequency of use of each basic block provides a method to rank the code blocks by importance. Code blocks that are frequently executed are called "hot" blocks, as opposed to rarely executed "cold" blocks.

When a function using certain registers is called during execution of a program, it is generally necessary to store (save to memory) the contents of these registers before the function starts to run, and then to restore the register contents when the function returns. For this purpose, compilers typically add appropriate store instructions to a prolog of the function in the compiled code, with corresponding restore instructions in an epilog. Because memory access has become a bottleneck for modern high-speed processors, eliminating superfluous store and restore operations can reduce program execution time substantially.

Martin et al. describe a method of compiler optimization based on eliminating storing and restoring the contents of dead registers in "Exploiting Dead Value Information," published in *Proceedings of Micro-30* (Research Triangle Park, N.C., 1997), which is incorporated herein by reference. Dead value information, providing assertions as to future use of registers, is calculated at compile time. The authors suggest that processor instruction set architectures be extended to enable this information to be communicated to the processor. In the absence of this hardware specialization, standard RISC call conventions may still allow a subset of the dead value information to be inferred and used by the processor in eliminating some of the store and restore operations at procedure calls and returns.

Cohn and Lowney describe a method of post-link optimization based on identifying frequently executed (hot) and infrequently executed (cold) blocks of code in functions in "Hot Cold Optimizations of Large Windows/NT Applications," published in *Proceedings of Micro* 29 (Research Triangle Park, N.C., 1996) which is incorporated herein by reference. The object code is disassembled into component code blocks, and the control flow graph (CFG) of the flow of control through the program is constructed. Code blocks are classified into code (instructions) and data. The code sections are further classified into functions. Using profile information, the functions are analyzed to find code blocks that are rarely executed. By experimentation, the authors chose to optimize functions containing blocks with less the 1% probability of execution. The code blocks in such functions that are on the primary path of execution are labeled "hot," and the rarely executed code blocks are labeled "cold." All hot blocks of code in the hot function are copied to a new location. All calls to the function are redirected to the new location. Flow paths in the hot routine that target cold code blocks are redirected to the appropriate location in the original function. Once the control path returns to the original function, it does not pass back to the copied function.

The new function is then optimized at the expense of paths of execution that pass through the cold path. The optimization comprises identifying unneeded code in the new hot function, and moving it to a stub that is called when the cold portion of the function is invoked, before actually returning to the original function. Cohn and Lowney describe five different types of optimization of the hot code:

Partial dead code elimination—the removal of dead code from the hot function. Once the cold code is removed from the hot function, some of the remaining instructions may be superfluous. An example of such an instruction is an add instruction that writes to a register that is only referenced within the cold code but is positioned within the hot block. The dead code is moved to the stub.

Non-volatile register elimination—the removal of the save and restore of non-volatile registers in the hot procedure. Non-volatile registers must be stored (restored) in the function prolog (epilog). Once dead code is removed from the hot function, the use of the non-volatile registers in the hot function is analyzed. If the registers are only referenced in the cold code, the store (restore) instructions are removed from the prolog (epilog) of the hot function, and the store instructions are moved to the stub. Since the cold code is followed by the original function epilog, the original restore instructions will restore the registers.

Stack pointer adjust elimination—the removal of the stack adjusts in the hot function. If all the non-volatile store instructions can be removed from the function prolog, the stack pointer adjustment (on computer architectures that require stack adjusts) can also be moved to the stub.

Peephole optimization—the removal of self-assignments and conditional branches with an always-false condition. Once the dead code is removed and excess non-volatile registers are freed, an additional pass through the code can identify instructions that are now irrelevant. An example of such an instruction is a restore instruction of a removed register that was turned into a self-assignment by copy propagation.

Inlining the hot function—the removal of control transfer to the hot function. Code straightening can be applied to the optimized code to inline the hot function.

Cohn and Lowney have implemented their methods of optimization in a tool named "Spike," which is used to optimize executables for the Windows NT™ operating system running on Alpha™ processors. Their method of classifying blocks as hot or cold requires a complete understanding of the CFG. It cannot be used if unclassified blocks appear in the control flow of the hot function. The method of eliminating non-volatile registers also requires that there be no references to the non-volatile register left in the function after removal of dead code. Additionally, the method of elimination of non-volatile registers requires duplication of the hot code to a new location.

Muth et al. describe the link-time optimizer tool "alto" in "alto: A Link-Time Optimizer for the Compaq Alpha," published in *Software Practice and Experience* 31 (January 2001), pages 67–101, which is incorporated herein by reference. Alto exploits the information available at link time, such as content of library functions, addresses of library variables, and overall code layout, to optimize the executable code after compilation. Alto can identify control paths where stores (restores) of non-volatile registers in function prologs (epilogs) are unnecessary, either because the registers are not touched along all execution paths through a function, or because the code that used those registers became unreachable. Code can become unreachable due to other optimizations carried out by alto, for instance because the outcome of a conditional branch could be predicted as a result of interprocedural constant propagation. The number of such stores (restores) can be reduced by moving them away from execution paths that do not need them.

Alto is similar to Spike in that its optimizations require a complete understanding of the control flow within the function. The store (restore) replacements are only carried out after other optimization techniques have created dead code within the function.

SUMMARY OF THE INVENTION

Preferred embodiments of the present invention provide generalized methods for post-link reduction of store and restore instructions in function prologs and epilogs based on run-time profiler feedback information, in order to optimize program execution. The methods of the present invention enable global program optimization, since they treat the entire executable code as a unified whole, unlike compiler optimizations, which are generally limited to the scope of the compilation unit.

Furthermore, while optimizing compilers are bound by linkage conventions, the post-link optimizer can ignore these conventions and remove unnecessary store and restore instructions. The methods of the present invention can thus be used to eliminate unneeded memory operations more thoroughly than is possible when only compile-time tools are used. These methods can be used for code optimization even when the source code is unavailable for compile-time optimizations, as may be the case when legacy object code or statically-linked object code libraries are incorporated in the executable. In addition, the methods of the present invention can be used even when the control flow within the program is only partially understood.

In preferred embodiments of the present invention, a post-link optimizer disassembles post-link object code in order to identify basic blocks of code in the executable file. It is not necessary to analyze the entire control flow graphs of the functions, as in optimization methods known in the art, but only to determine their constituent instructions. Basic blocks are identified as functions, code within functions, and data. The functions typically have a prolog and an epilog, containing store and restore instructions with respect to registers used by the function. These registers are referred to herein as non-volatile registers. Preferably, run-time profiling, as is known in the art, is used to identify functions that are frequently called by other, less frequently-invoked functions. The frequently-called functions are herein referred to as callee functions, relative to the less frequently-called caller functions.

The optimizer locates unused registers in a fully-disassembled caller function that are stored (restored) in the callee function prolog (epilog). The optimizer then modifies the post-link code so as to remove the store (restore) instructions from the callee function prolog (epilog) and instead, add corresponding store/restore instructions in the caller prolog (epilog). In the context of the present patent application and in the claims, this sort of modification is referred to as "percolating" the store (restore) instructions from the callee to the caller.

If unused registers exist in the caller function, but the unused registers do not match registers stored/restored in the callee prolog/epilog, the optimizer preferably renames registers used in the caller or in the callee function so as to enable the optimization.

The optimized callee function utilized by the caller function is preferably appended to the end of the original post-link code, and the call instruction is redirected to the newly-appended function. Although the optimized code is typically longer than the original post-link code, additional optimization steps as are known in the art, such as code straightening, can be applied to the code thereafter.

There is therefore provided, in accordance with a preferred embodiment of the present invention, a method for code optimization, the method including:

disassembling object code that has been compiled and linked;

analyzing the disassembled code so as to identify a callee function in the code, the callee function including store and restore instructions with respect to a non-volatile register, and further to identify in the code a call instruction to the callee function located inside a caller function; and modifying the code so as to move at least one of the store and restore instructions with respect to the non-volatile register from the callee function to the caller function.

Preferably, modifying the code includes moving the at least one of the store and restore instructions after determining that the non-volatile register is not used in the caller function.

In another preferred embodiment, modifying the code includes locating an unused register in the caller function, and modifying the caller function to reference the unused register instead of the non-volatile register.

In yet another preferred embodiment, modifying the code includes:

creating a copy of the callee function;

removing the at least one of the store and restore instructions from the copy; and modifying the call instruction to reference the copy instead of the callee function.

Preferably, the object code includes a fixed sequence of code instructions ending with a last instruction, and creating the copy includes adding a copy of the callee function after the last instruction.

Additionally preferably, analyzing the disassembled code includes identifying call instructions to the callee function located in a plurality of caller functions, and modifying the code includes selecting at least one of the plurality of caller functions to modify.

Preferably, modifying the code includes moving the at least one of the store and restore instructions after determining that the non-volatile register is not used in the at least one of the plurality of caller functions that is selected.

Preferably, modifying the code includes, for each one of the plurality of caller functions, finding any use of the non-volatile register in the one of the plurality of caller functions, and inserting a store instruction before the call instruction and a restore instruction after the call instruction in the one of the plurality of caller functions.

Preferably, modifying the code includes, if the use is not found, adding the at least one of the store and restore instructions to the one of the plurality of caller functions.

In another preferred embodiment, the callee function has an original name, and modifying the code includes:

removing the at least one of the store and restore instructions from the callee function;

renaming the callee function with a new name; and creating an added function with the original name of the callee function, the added function including the at least one of the store and restore instructions removed from the callee function and a call to the callee function using the new name.

Preferably, the object code includes a fixed sequence of code instructions ending with a last instruction, and creating the added function includes inserting the added function after the last instruction.

Additionally preferably, analyzing the disassembled code includes identifying call instructions to the callee function located in a plurality of caller functions, and modifying the code includes selecting at least one of the plurality of caller functions to modify.

Preferably, modifying the code includes moving the at least one of the store and restore instructions after determining that the non-volatile register is not used in the at least one of the plurality of caller functions that is selected.

Preferably, modifying the code includes, for each one of the plurality of caller functions, finding any use of the at least one of the non-volatile register in the one of the plurality of caller functions, and inserting a store instruction before the call instruction and a restore instruction after the call instruction in the one of the plurality of caller functions.

Preferably, modifying the code includes, if the use is not found, adding the at least one of the store and restore instructions to the one of the plurality of caller functions.

Additionally preferably, a function includes a name, and creating the added function includes renaming the callee function with a new name, and naming the added function with the name of the callee function.

In yet another preferred embodiment, modifying the code includes adding the at least one of the store and restore instructions to the caller function.

Preferably, the caller function includes a fixed sequence of code instructions, and modifying the code includes modifying the code without altering the fixed sequence.

Further preferably, adding the at least one of the store and restore instructions includes replacing an instruction in at least one of the prolog and epilog of the caller function with an unconditional branch to a caller function wrapper code, and the caller function wrapper code includes the instruction so replaced and the at least one of the store and restore instructions.

In another alternative embodiment, analyzing the disassembled code includes determining a sum of frequencies of executing the call instruction to the callee function within the caller function, and modifying the code comprises modifying the code conditional upon the sum of the frequencies of executing the call instruction being greater than of the sum of the frequencies of execution of call instructions to the caller function.

In yet another alternative embodiment, modifying the code includes recompiling the object code.

There is additionally provided, in accordance with a preferred embodiment of the present invention, apparatus for code optimization, including a code processor, which is arranged to disassemble object code that has been compiled and linked, to analyze the disassembled code so as to identify a callee function in the code, the callee function including store and restore instructions with respect to a non-volatile register, and further to identify in the code a call instruction to the callee function located inside a caller function, and to modify the code so as to move at least one of the store and restore instructions with respect to the non-volatile register from the callee function to the caller function.

There is further additionally provided, in accordance with a preferred embodiment of the present invention, a computer software product, including a computer-readable medium in which software is stored, which software, when read by a computer, causes the computer to disassemble object code that has been compiled and linked, to analyze the disassembled code so as to identify a callee function in the code, the callee function including store and restore instructions with respect to a non-volatile register, and further to identify in the code a call instruction to the callee function located inside a caller function, and to modify the code so as to move at least one of the store and restore instructions with respect to the non-volatile register from the callee function to the caller function.

The present invention will be more fully understood from the following detailed description of the preferred embodiments thereof, taken together with the drawings in which:

DETAILED DESCRIPTION OF PREFERRED EMBODIMENTS

Figure 1:
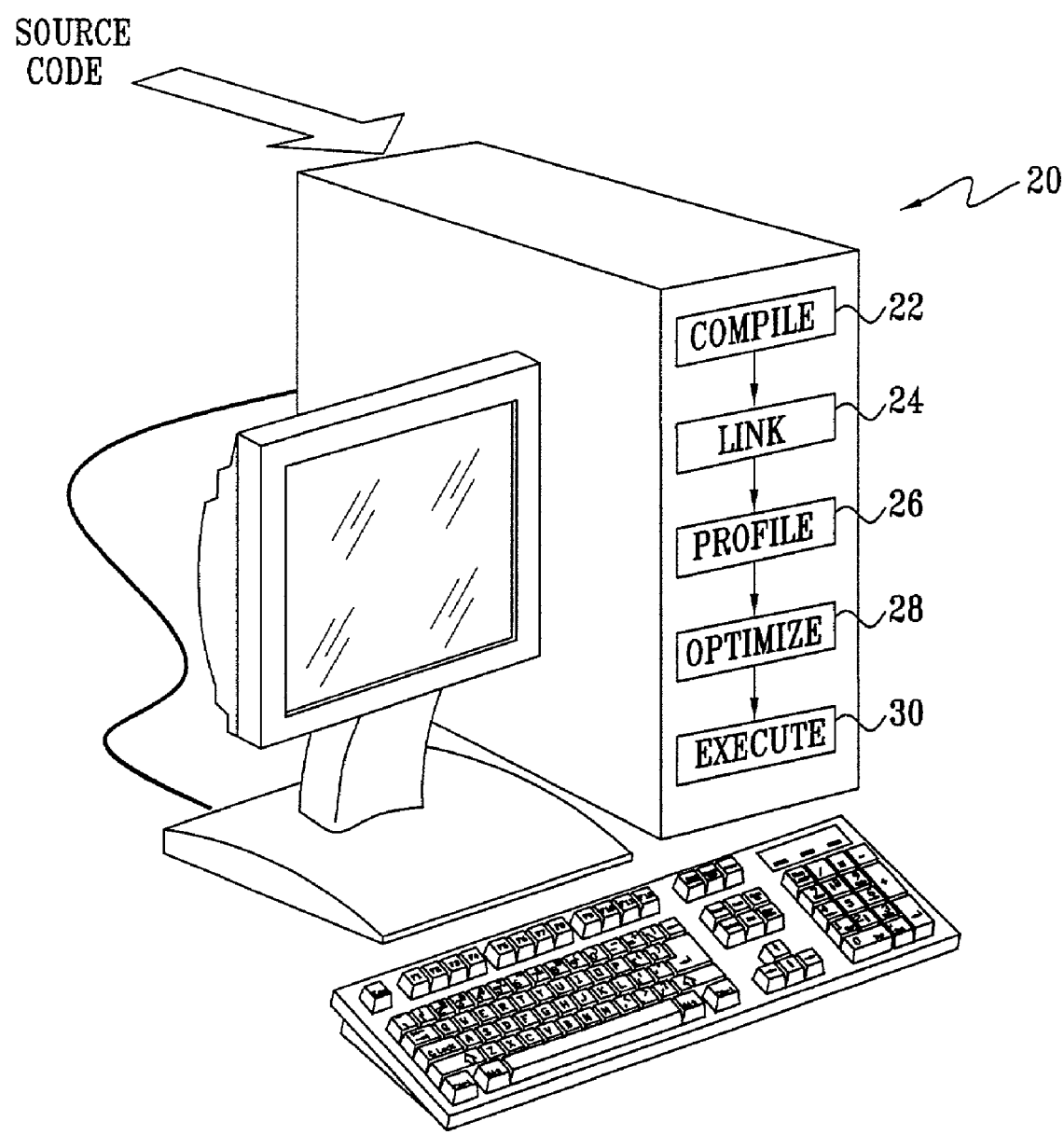
FIG. 1 is a block diagram that schematically illustrates a system for processing computer program code, in accordance with a preferred embodiment of the present invention.

FIG. 1 is a block diagram that schematically illustrates a system 20 for processing computer program code, in accordance with a preferred embodiment of the present invention. System 20 preferably comprises a general-purpose computer processor, which is programmed to carry out the functions described hereinbelow. The processor performs these functions under the control of software supplied for this purpose. The software may be downloaded to the processor in electronic form, over a network, for example, or it may alternatively be provided on tangible media, such as CD-ROM.

System 20 typically receives source code that is prepared by a programmer. A compiler 22 compiles the source code to generate object code, and a linker 24 links the compiled code with library code, as is known in the art. The linked code is fed to a profiler 26, which obtains run-time information about the frequency of use of each block of object code in the linked code. The profile information is fed to an optimizer 28, which labels often-run blocks as "hot" and seldom-run blocks as "cold," and then analyzes and modifies the code to eliminate non-volatile register store/restore instructions located in the prolog and epilog of hot functions, as described in detail hereinbelow. The optimized code can then be executed by a run-time module 30, as is likewise known in the art. Although all of functions 22 through 30 are shown for simplicity as being performed in system 20, it will be appreciated that these functions may also be separated and carried out on different computers. Thus, optimizer 28, which is the element of concern to the present invention, may receive profile information from another source, outside system 20, and may pass the optimized code to yet another computer for execution.

Figure 2:
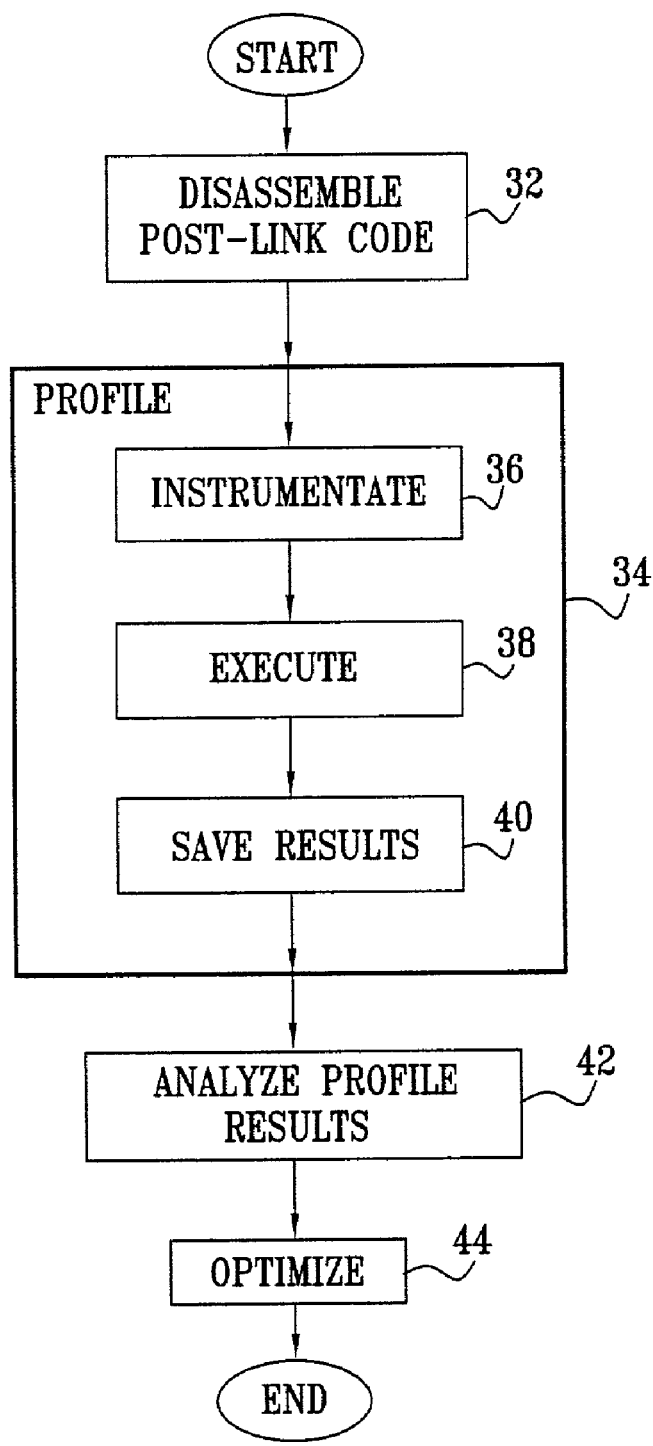
FIG. 2 is a flow chart that schematically illustrates a method for optimizing post-link code, in accordance with a preferred embodiment of the present invention.

FIG. 2 is a flow chart that schematically illustrates a method for optimizing post-link code, carried out by optimizer 28, in accordance with a preferred embodiment of the present invention. The post-link code is disassembled, at a disassembly step 32, in order to identify the instructions in the code. Any suitable method known in the art can be used for this purpose. Preferably, an incremental disassembly method is used to dissect the code into its basic blocks, as described in the above-mentioned articles by Haber et al. and by Henis et al., for example. For this purpose, addresses of instructions within the executable code are extracted from a variety of sources, in order to form a list of "potential entry points." The sources typically include program/DLL entry points, the symbol table (for functions and labels), and relocation tables (through which pointers to the code can be accessed). The optimizer traverses the program by following the control flow starting from these entry points—while resolving all possible control flow paths—and adding newly-discovered addresses of additional potential entry points to the list, such as targets of JUMP and CALL instructions.

Following the control flow of the program in this manner covers a large percentage of the code. Basic blocks that are not directly discoverable by incremental disassembly are marked as "unclassified code." These blocks typically consist of code reached via a jump by a target register that is resolved only at runtime. It is sometimes possible to classify these blocks using instrumentation of the code and dynamic runtime analysis, as described by Henis et al., but a description of this method is beyond the scope of the present patent application.

At the end of the incremental disassembly process, the entire code section of the original program is dissected into basic blocks, which are either classified or unclassified. The classified blocks are marked with flags, which characterize them as either code or data (such as branch table data), and which identify the control flow properties of the code blocks, such as Fallthrough, Continue, Call, Return, Jump, etc. The Call and Return flags, inter alia, are used to identify functions and function calls in the code.

The disassembled code is profiled at a code profiling step 34. Profiling begins at an instrumentation step 36, wherein each basic block is modified so that each time the program execution passes through the block a counter is incremented, as described in the above-mentioned article by Henis et al., in section 2.3. Additional code is added to the beginning of each basic block, termed instrumentation code. This code performs a CALL jump to a universal stub function. The universal stub function makes use of the return address argument passed by the CALL instruction to identify from which basic block it was called. The counter for that basic block is incremented each time the universal stub is called from within that block during the profiling run. The universal stub function then returns execution to the calling basic block.

A second method of instrumentation, useful on platforms where no CALL instruction exists, comprises overriding the last instruction of each basic block with a JUMP instruction to a designated code area that is appended to the end of the original code section. In that area, the counter associated with the basic block is incremented. The overwritten last instruction that was taken from the original basic block is executed in the appended area, thus maintaining the original program semantics. Using this method, the original code section size is kept intact, and most of the code is unaltered (except the overwritten last instructions of the basic blocks, which in most cases are control transferring instructions)

The instrumented program is run at an execution step 38. On profiling run termination, the information is retrieved from the counters and written to a log file at a save results step 40. At a profiling analysis step 42, the basic blocks are classified by the frequency of use. Frequently used blocks are labeled "hot," and rarely used blocks are labeled "cold." Correspondingly, hot (cold) functions are functions that are called frequently (rarely). The optimizer uses the disassembled code and the profile information at a optimization step 44 to percolate store/restore instructions from a hot function's prolog/epilog to the hot function's cold caller function, as described hereinbelow.

Figure 3:
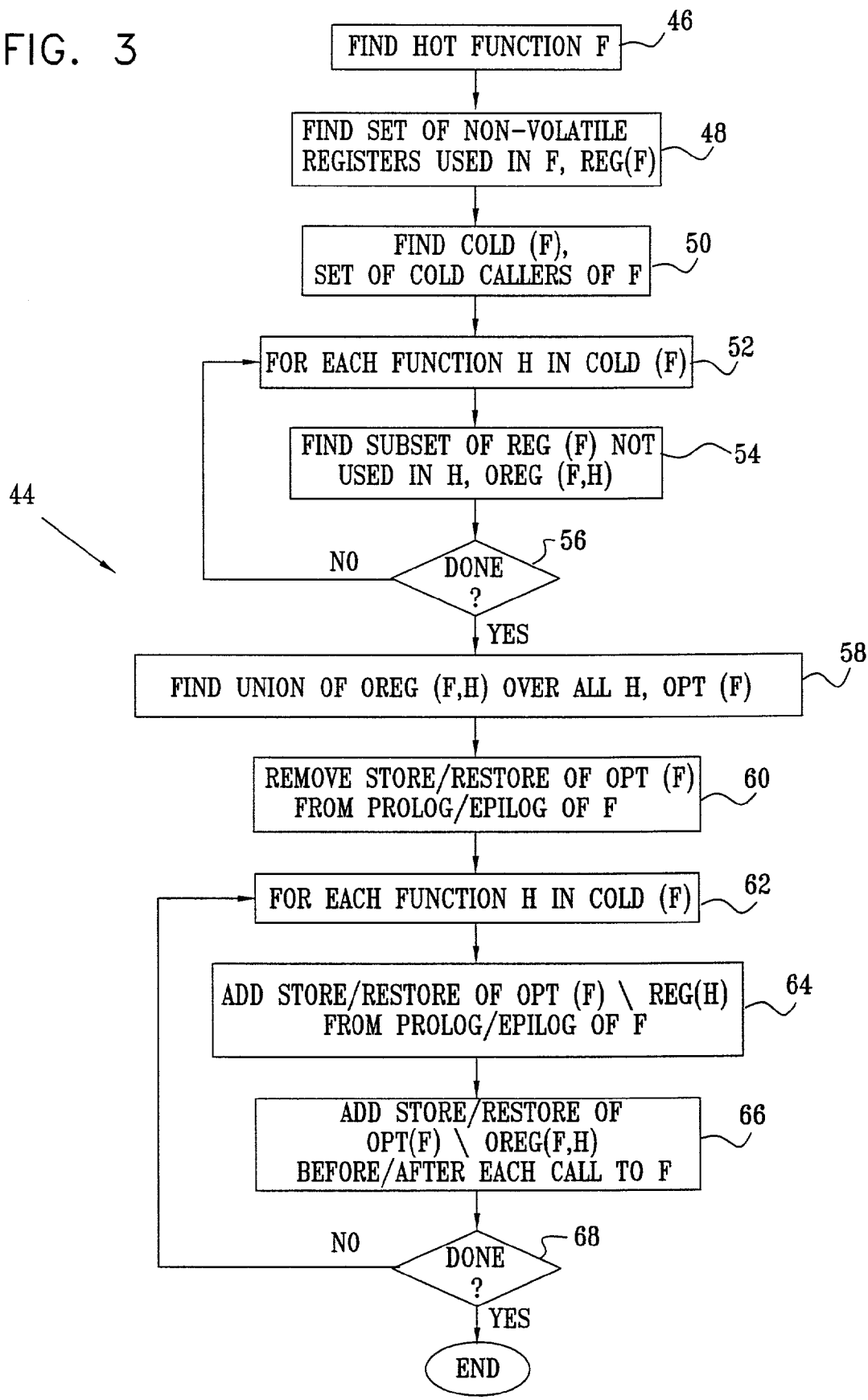
FIG. 3 is a flow chart that schematically illustrates a method for percolating stores/restores from hot function prolog/epilogs to their cold caller functions, in accordance with a preferred embodiment of the present invention.

FIG. 3 is a flow chart that schematically illustrates a preferred method for optimizing post-link code by percolating stores/restores from hot function prolog/epilogs to their cold callers, carried out by the optimizer in optimization step 44, in accordance with a preferred embodiment of the present invention. In the context of the present patent application, the following definitions and notations are used to describe the preferred method of optimization:

Non-volatile register—a register Rx is considered to be non-volatile in some function f if the value in Rx is saved in the prolog of f and then restored back in the epilog of f. Therefore, a function that calls f can assume that the value in Rx prior to the call is not affected by invoking f.

Hot function—a function is considered to be hot when it is frequently invoked, as determined in analysis step 40.

Cold caller function—a function h is considered to be a cold caller of hot function f if h calls f and h is colder, even by one, than the call instruction that invokes f. This means that the sum of frequencies of executing the call instruction to f within h is greater than of the sum of the frequencies of execution of call instructions to h itself.

Fully disassembled function—a function is considered to be fully disassembled if all its constituent instructions are known.

Optimizable Function—a function f is considered optimizable when the following criteria are met:
1. f has a cold caller function h.
2. f and h are fully disassembled.
3. There exists a non-volatile register Rx that is used in f, but not used in h.

The optimizer locates a hot function at a finding step 46. For each hot function f, the optimizer locates REG(f)—the set of all non-volatile registers used in f—at a register finding step 48, and COLD(f)—the set of cold caller functions of f—at a caller finding step 50. COLD(f) includes all functions that are invoked less frequently than f, even by one invocation. The optimizer then loops through each function h in COLD(f) at a COLD(f) loop step 52. For each cold caller function h in COLD(f), the optimizer finds a subset OREG(f,h) of the registers in REG(f) that are unused in h, at an OREG(f,h) finding step 54. The loop continues until all the functions h have been processed, at a done step 56.

At OREG(f,h) finding step 54, the optimizer locates all unused registers in h that are members of REG(f). Preferably, the optimizer tries to enlarge OREG(f,h) by pairing each register Rm that is used in h and is a member of REG(f) with a register Rn that is unused in h and is not a member of REG(f). When such a pairing exists, the optimizer then renames each reference to Rm in h with a reference to Rn. As a consequence, Rm is now unused in h, and the optimizer can include Rm in OREG(f,h).

The set of registers OPT(f) which is the union of all registers in OREG(f,h) over all possible h is found by the optimizer at a union step 58. If OPT(f) is non-empty, the optimizer removes the store/restore instructions from the prolog/epilog of f at a store/restore removal step 60. Preferably, the optimizer copies the instructions in f to a new location, and names the relocated function f_opt. The optimizer then removes the store/restore instructions referring to all registers in OPT(f) from f_opt.

The optimizer again loops over all COLD(f) at a second COLD(f) loop step 62. The optimizer adds the store/restore instructions removed from f_opt to each function h in COLD(foo), at a store/restore add step 64. Preferably, the optimizer uses a wrapper code to add the instructions to the prolog and epilog of function h. In the prolog of function h, let addr_pro be the address of an existing store instruction for some non-volatile register Rx, and let addr_pro_next be the address of the instruction following addr_pro. The optimizer replaces the instruction at addr_pro with a branch to a wrapper code comprising the store instruction for Rx, additional instructions to store each of the registers in OREG(f,h), and a branch to addr_pro_next. In the epilog of function h, let addr_epi be the address of the existing restore instruction for non-volatile register Rx, and let addr_epi_next be the address of the instruction following addr_epi. The optimizer replaces the instruction at addr_epi with a branch to a wrapper code comprising the restore instruction for Rx, additional instructions to restore each of the registers in OREG(f,h), and a branch to addr_epi_next.

At each call to function f in function h, the optimizer adds store/restore instructions for the set of registers in OPT(f) that are not in OREG(f,h) at a store/restore add step 66. Preferably, the optimizer replaces each instruction that calls function f with a branch to a wrapper code comprising a store instruction for each register in OPT(f) that is not in OREG(f,h), a call instruction to f_opt, a restore instruction for each register in OPT(f) that is not in OREG(f,h), and a branch back to the address following the original call to function f. The optimizer loops through all the functions h until all of them have been processed, at a done step 68.

Table I below lists sample disassembled post-link code of a hot function bar and of two cold functions foo and gal that call bar. For the sake of this example, bar is characterized by:
REG (bar)={R29, R30, R31}
COLD(bar)={foo, gal}
OREG (bar,foo)={R29}

OREG (bar,gal)={R29,R30}
OPT (bar)=OREG (bar,foo) ∪ OREG (bar,gal)={R29, R30}

The left column in the table below shows the post-link code before optimization, while the right column shows the code after optimization. Hot code is shown in boldface, while cold code is shown in regular type.

TABLE I

CODE COMPARISON

| Before optimization | | After optimization | |
|---|---|---|---|
| Program begin | | Program begin | |
| ... | | ... | |
| Function foo: | | Function foo: | |
| Prolog: | | Prolog: | |
| | ... | | ... |
| | store R30 | | store R30 |
| FOO1: | store R31 | FOO1: | branch W3 |
| FOO2: | ... | FOO2: | ... |
| body: | | body: | |
| | ... | | ... |
| L1: | call bar | L1: | branch W1 |
| L2: | ... | L2: | ... |
| Epilog: | | Epilog: | |
| | ... | | ... |
| FOO3: | restore R30 | FOO3: | branch W4 |
| FOO4: | restore R31 | FOO4: | restore R31 |
| | ... | | ... |
| | return | | return |
| | ... | | ... |
| | ... | | ... |
| Function gal: | | Function gal: | |
| Prolog: | | Prolog: | |
| | ... | | ... |
| GAL1: | store R31 | GAL1: | branch W5 |
| GAL2: | ... | GAL2: | ... |
| body: | | body: | |
| | ... | | ... |
| L3: | call bar | L3: | branch W2 |
| L4: | ... | L4: | ... |
| Epilog: | | Epilog: | |
| | ... | | ... |
| GAL3: | restore R31 | GAL3: | branch W6 |
| GAL4: | ... | GAL4: | ... |
| | return | | return |
| | ... | | ... |
| | ... | | ... |
| Function bar: | | Function bar: | |
| Prolog: | | Prolog: | |
| | ... | | ... |
| | store R29 | | store R29 |
| | store R30 | | store R30 |
| | store R31 | | store R31 |
| | ... | | ... |
| Epilog: | | Epilog: | |
| | ... | | ... |
| | restore R29 | | restore R29 |
| | restore R30 | | restore R30 |
| | restore R31 | | restore R31 |
| | ... | | ... |
| | return | | return |
| | ... | | ... |
| program end | | Function bar_opt: | |
| | | Prolog: | |
| | | | ... |
| | | | store R31 |
| | | | ... |
| | | Epilog: | |
| | | | ... |
| | | | restore R31 |
| | | | ... |
| | | | return |
| | | | ... |
| | | | ... |
| /* foo's call to bar*/ | | W1: | store R30 |
| | | | call bar_opt |

TABLE I-continued

CODE COMPARISON

| Before optimization | | After optimization | |
|---|---|---|---|
| | | | restore R30 |
| | | | branch L2 |
| /* gal's call to bar */ | | W2: | call bar_opt |
| | | | branch L4 |
| /* percolated to foo's prolog */ | | W3: | store R29 |
| | | | branch FOO2 |
| /* percolated to foo's epilog */ | | W4: | restore R29 |
| | | | branch FOO4 |
| /* percolated to to gal's prolog */ | | W5: | store R29 |
| | | | store R30 |
| | | | branch GAL2 |
| /* percolated to to gal's epilog */ | | W6: | restore R29 |
| | | | restore R30 |
| | | | branch GAL4 |
| | | | ... |
| | | | ... |
| | | program end | |

The optimizer has added wrapper code W3 to the prolog of foo. Wrapper code W3 includes store instructions for each of OREG(bar,foo)={R30}, along with the original store instruction that was replaced by the branch to the wrapper code, store R31. Wrapper W4, added to the epilog of foo, includes a restore instruction for each store in W3. Similarly, W5 and W6 are inserted into gal's prolog and epilog respectively. They include store/restore instructions for OREG(bar,gal)={R29,R30}, along with the supplanted store/restore of R31.

The optimizer has replaced the calls to bar at L1 and L3 with wrapper code W1 and W2 respectively. Since OPT(bar) \OREG (bar, foo)={R30}, the wrapper code W1 replacing the call to bar in foo includes store/restore instructions for R30, as well as a call to bar_opt. Wrapper code W2, which replaces the call to bar in gal, includes no store/restore instructions since OPT(bar)\OREG(bar,gal) is the empty set. Preferably, the optimizer will eliminate wrapper code W2, and replace the call to bar in gal at L3 with a call to bar_opt instead.

In other words, a store/restore instruction for each of the registers in OPT(bar) is added in place of the corresponding instructions removed from the prolog/epilog of bar. If a given register is unused in the caller function, the caller function is modified by adding the store/restore instructions to the caller function prolog/epilog. The register will be saved in the caller stack frame. If the register is used in the caller function, the store/restore instructions are added to the wrapper code before/after the call to bar_opt. The register will be saved in the stack frame of bar_opt.

Duplicating the code of function bar is done in order to preserve the correctness of the program. The program may contain undetected call instructions to bar, such as call instructions via registers or call instructions from other modules such as libraries. All the detected call instructions will be redirected, according to the above optimization algorithm, to invoke the optimized function bar_opt, whereas all the undetected call instructions will continue to branch to the original non-optimized function bar. In cases where the entire control flow graph is known, the optimizer need not duplicate the code in bar to a new location, and will instead preferably replace all store/restore instructions that reference OPT(bar) in the prolog/epilog of bar with NOP instructions.

Realistically, the entire control flow graph is rarely completely known. When the control flow graph is incompletely known, the optimizer preferably optimizes the original bar in situ and renames it bar_opt. The optimizer then creates a new wrapper function. The new wrapper function comprises the removed store instructions, a call to bar_opt, and the removed restore instructions. The new wrapper function is named bar, since it is functionally equivalent to the original function bar. All calls to bar that cannot safely use bar_opt are routed to the new wrapper function. For instance, if bar is located in a library that is loaded into memory at run-time, the function location table in the library header is modified so that any caller function that calls bar from outside the library is referred to the new wrapper function instead of bar_opt.

Table II below demonstrates optimizing function bar in situ. The conventions and assumptions used in the table are identical to those in Table I.

TABLE II

CODE COMPARISON

| Before optimization | | After optimization | |
|---|---|---|---|
| Program begin | | Program begin | |
| ... | | ... | |
| Function foo: | | Function foo: | |
| Prolog: | | Prolog: | |
| ... | | ... | |
| | store R30 | | store R30 |
| FOO1: | store R31 | FOO1: | branch W3 |
| FOO2: | ... | FOO2: | ... |
| body: | | body: | |
| ... | | ... | |
| L1: | call bar | L1: | branch W1 |
| L2: | ... | L2: | ... |
| Epilog: | | Epilog: | |
| ... | | ... | |
| FOO3: | restore R30 | FOO3: | branch W4 |
| FOO4: | restore R31 | FOO4: | restore R31 |
| | ... | | ... |
| | return | | return |
| ... | | ... | |
| ... | | ... | |
| Function gal: | | Function gal: | |
| Prolog: | | Prolog: | |
| ... | | ... | |
| GAL1: | store R31 | GAL1: | branch W5 |
| GAL2: | ... | GAL2: | ... |
| body: | | body: | |
| ... | | ... | |
| L3: | call bar | L3: | branch W2 |
| L4: | ... | L4: | ... |
| Epilog: | | Epilog: | |
| ... | | ... | |
| GAL3: | restore R31 | GAL3: | branch W6 |
| GAL4: | ... | GAL4: | ... |
| | return | | return |
| ... | | ... | |
| ... | | ... | |
| Function bar: | | Function bar_opt: | |
| Prolog: | | Prolog: | |
| ... | | ... | |
| | store R29 | | NOP |
| | store R30 | | NOP |
| | store R31 | | store R31 |
| | ... | | ... |
| Epilog: | | Epilog: | |
| | ... | | ... |
| | restore R29 | | NOP |
| | restore R30 | | NOP |
| | restore R31 | | restore R31 |
| | ... | | ... |
| | return | | return |
| | ... | | ... |
| | ... | | ... |
| program end | | Function bar: | |
| | | Prolog: | |
| | | | store R29 |

TABLE II-continued

CODE COMPARISON

| Before optimization | | After optimization |
|---|---|---|
| | | store R30 |
| | | call bar_opt |
| | Epilog: | |
| | | restore R29 |
| | | restore R30 |
| | | return |
| | | ... |
| | | ... |
| /* foo's call to bar*/ | W1: | store R30 |
| | | call bar_opt |
| | | restore R30 |
| | | branch L2 |
| /* gal's call to bar */ | W2: | call bar_opt |
| | | branch L4 |
| /* percolated to foo's prolog */ | W3: | store R29 |
| | | branch FOO2 |
| /* percolated to foo's epilog */ | W4: | restore R29 |
| | | branch FOO4 |
| /* percolated to to gal's prolog */ | W5: | store R29 |
| | | store R30 |
| | | branch GAL2 |
| /* percolated to to gal's epilog */ | W6: | restore R29 |
| | | restore R30 |
| | | branch GAL4 |
| | | ... |
| | | ... |
| | | program end |

Table II is functionally equivalent to Table I. Only the positions of bar_opt and bar have been interchanged. Less code must be added when using the technique shown in Table II than that in Table I, since we do not duplicate the entire function.

Preferably, after performing the optimization described above, a code-straightening algorithm is applied to the generated code in order to remove the unconditional branches to and from the wrapper codes. Straightening algorithms are known in the art of post-link optimization tools, such as the FDPR (Feedback Directed Program Restructuring) tool offered by IBM Corporation (Armonk, N.Y.) as part of the Performance Tool Box (PTX) for the AIX™ operating system. Further aspects of FDPR are described in the above-mentioned articles by Haber et al., Henis et al., and Schmidt et al.

The preferred embodiments described above are all based on the assumption that for the sake of safety, the original post-link code cannot be expanded or shrunk during optimization. The principles of the present invention can also be applied, however, in an environment that enables deletion, addition and movement of code. Such an environment is provided by some post-link compilers, particularly when the entire program can be successfully disassembled, as well as within the framework of an optimizing compiler that exploits profiling information. In this environment, the need for wrapper codes can be avoided by instead inserting the required store and restore instructions directly before and after the corresponding call instruction in f. Preferably, instead of replacing the store/restore instructions in the function prolog/epilog with NOP instructions as in the case when the control flow graph is fully known, the store/restore instructions are removed from the prolog/epilog of f.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for code optimization, comprising:
disassembling object code that has been compiled and linked;
analyzing the disassembled code so as to identify a callee function in the code, the callee function including store and restore instructions with respect to a non-volatile register, and further to identify in the code a call instruction to the callee function located inside a caller function; and
modifying the code so as to move at least one of the store and restore instructions with respect to the non-volatile register from the callee function to the caller function,
wherein analyzing the disassembled code comprises determining a sum of frequencies of executing the call instruction to the callee function within the caller function, and modifying the code comprises modifying the code conditional upon the sum of the frequencies of executing the call instruction being greater than of the sum of the frequencies of execution of call instructions to the caller function.

2. A method according to claim 1, wherein modifying the code comprises moving the at least one of the store and restore instructions after determining that the non-volatile register is not used in the caller function.

3. A method according to claim 1, wherein modifying the code comprises locating an unused register in the caller function, and modifying the caller function to reference the unused register instead of the non-volatile register.

4. A method according to claim 1, wherein modifying the code comprises:
creating a copy of the callee function;
removing the at least one of the store and restore instructions from the copy; and
modifying the call instruction to reference the copy instead of the callee function.

5. A method according to claim 4, wherein the object code comprises a fixed sequence of code instructions ending with a last instruction, and creating the copy comprises adding a copy of the callee function after the last instruction.

6. A method according to claim 4, wherein analyzing the disassembled code comprises identifying call instructions to the callee function located in a plurality of caller functions, and wherein modifying the code comprises selecting at least one of the plurality of caller functions to modify.

7. A method according to claim 6, wherein modifying the code comprises moving the at least one of the store and restore instructions after determining that the non-volatile register is not used in the at least one of the plurality of caller functions that is selected.

8. A method according to claim 7, wherein modifying the code comprises, for each one of the plurality of caller functions, finding any use of the non-volatile register in the one of the plurality of caller functions, and inserting a store instruction before the call instruction and a restore instruction after the call instruction in the one of the plurality of caller functions.

9. A method according to claim 8, wherein modifying the code comprises, if the use is not found, adding the at least one of the store and restore instructions to the one of the plurality of caller functions.

10. A method according to claim 1, wherein the callee function has an original name, and wherein modifying the code comprises:
removing the at least one of the store and restore instructions from the callee function;
renaming the callee function with a new name; and creating an added function with the original name of the callee function, the added function comprising the at least one of the store and restore instructions removed from the callee function and a call to the callee function using the new name.

11. A method according to claim 10, wherein the object code comprises a fixed sequence of code instructions ending with a last instruction, and creating the added function comprises inserting the added function after the last instruction.

12. A method according to claim 10, wherein analyzing the disassembled code comprises identifying call instructions to the callee function located in a plurality of caller functions, and wherein modifying the code comprises selecting at least one of the plurality of caller functions to modify.

13. A method according to claim 12, wherein modifying the code comprises moving the at least one of the store and restore instructions after determining that the non-volatile register is not used in the at least one of the plurality of caller functions that is selected.

14. A method according to claim 13, wherein modifying the code comprises, for each one of the plurality of caller functions, finding any use of the at least one of the non-volatile register in the one of the plurality of caller functions, and inserting a store instruction before the call instruction and a restore instruction after the call instruction in the one of the plurality of caller functions.

15. A method according to claim 14, wherein modifying the code comprises, if the use is not found, adding the at least one of the store and restore instructions to the one of the plurality of caller functions.

16. A method according to claim 10, wherein a function comprises a name, and creating the added function comprises renaming the callee function with a new name, and naming the added function with the name of the callee function.

17. A method according to claim 1, wherein modifying the code comprises adding the at least one of the store and restore instructions to the caller function.

18. A method according to claim 17, wherein the caller function comprises a fixed sequence of code instructions, and modifying the code comprises modifying the code without altering the fixed sequence.

19. A method according to claim 18, wherein adding the at least one of the store and restore instructions comprises replacing an instruction in at least one of the prolog and epilog of the caller function with an unconditional branch to a caller function wrapper code, and wherein the caller function wrapper code comprises the instruction so replaced and the at least one of the store and restore instructions.

20. A method according to claim 1, wherein modifying the code comprises recompiling the object code.

21. Apparatus for code optimization, comprising a code processor, which is arranged to disassemble object code that has been compiled and linked, to analyze the disassembled code so as to identify a callee function in the code, the callee function including store and restore instructions with respect to a non-volatile register, and further to identify in the code a call instruction to the callee function located inside a caller function, and to modify the code so as to move at least one of the store and restore instructions with respect to the non-volatile register from the callee function to the caller function,
  wherein the processor is arranged to determine a sum of frequencies of executing the call instruction to the callee function within the caller function, and to modify the code conditional upon the sum of the frequencies of executing the call instruction being greater than the sum of the frequencies of execution of call instructions to the caller function.

22. Apparatus according to claim 21, wherein the processor is arranged to move the at least one of the store and restore instructions after determining that the non-volatile register is not used in the caller function.

23. Apparatus according to claim 21, wherein the processor is arranged to locate an unused register in the caller function, and to modify the caller function to reference the unused register instead of the non-volatile register.

24. Apparatus according to claim 21, wherein the processor is arranged to create a copy of the callee function, to remove the at least one of the store and restore instructions from the copy, and to modify the call instruction to reference the copy instead of the callee function.

25. Apparatus according to claim 24, wherein the object code comprises a fixed sequence of code instructions ending with a last instruction, and the processor is arranged to add a copy of the callee function after the last instruction.

26. Apparatus according to claim 24, wherein the processor is arranged to identify call instructions to the callee function located in a plurality of caller functions, and to select at least one of the plurality of caller functions to modify.

27. Apparatus according to claim 26, wherein the processor is arranged to move the at least one of the store and restore instructions after determining that the non-volatile register is not used in the at least one of the plurality of caller functions that is selected.

28. Apparatus according to claim 27, wherein the processor is arranged, for each one of the plurality of caller functions, to find any use of the at least one of the non-volatile register in the one of the plurality of caller functions, and to insert a store instruction before the call instruction and a restore instruction after the call instruction in the one of the plurality of caller functions.

29. Apparatus according to claim 28, wherein the processor is arranged, if the use is not found, to add the at least one of the store and restore instructions to the one of the plurality of caller functions.

30. Apparatus according to claim 21, wherein the callee function has an original name, and wherein the processor is arranged to remove the at least one of the store and restore instructions from the callee function and to rename the callee function with a new name, and to create an added function with the original name of the callee function, the added function comprising the at least one of the store and restore instructions removed from the callee function and a call to the callee function using the new name.

31. Apparatus according to claim 30, wherein the object code comprises a fixed sequence of code instructions ending with a last instruction, and the processor is arranged to insert the added function after the last instruction.

32. Apparatus according to claim 30, wherein the processor is arranged to identify call instructions to the callee function located in a plurality of caller functions, and to select at least one of the plurality of caller functions to modify.

33. Apparatus according to claim 32, wherein the processor is arranged to move the at least one of the store and restore instructions after determining that the non-volatile register is not used in the at least one of the plurality of caller functions that is selected.

34. Apparatus according to claim 33, wherein the processor is arranged, for each one of the plurality of caller functions, to find any use of the at least one of the non-volatile register in the one of the plurality of caller functions, and to insert a store instruction before the call instruction and a restore instruction after the call instruction in the one of the plurality of caller functions.

35. Apparatus according to claim 34, wherein the processor is arranged, if the use is not found, to add the at least one of the store and restore instructions to the one of the plurality of caller functions.

36. Apparatus according to claim 30, wherein a function comprises a name, and the processor is arranged to rename the callee function with a new name, and name the added function with the name of the callee function.

37. Apparatus according to claim 21, wherein the processor is arranged to add the at least one of the store and restore instructions to the caller function.

38. Apparatus according to claim 37, wherein the caller function comprises a fixed sequence of code instructions, and the processor is arranged to modify the code without altering the fixed sequence.

39. Apparatus according to claim 38, wherein the processor is arranged to replace an instruction in at least one of the prolog and epilog of the caller function with an unconditional branch to a caller function wrapper code, and wherein the caller function wrapper code comprises the instruction so replaced and the at least one of the store and restore instructions.

40. Apparatus according to claim 21, wherein the processor is arranged to modify the code by recompiling the object code.

41. A computer software product, comprising a computer-readable medium in which software is stored, which software, when read by a computer, causes the computer to disassemble object code that has been compiled and linked, to analyze the disassembled code so as to identify a callee function in the code, the callee function including store and restore instructions with respect to a non-volatile register, and further to identify in the code a call instruction to the callee function located inside a caller function, and to modify the code so as to move at least one of the store and restore instructions with respect to the non-volatile register from the callee function to the caller function,
  wherein the software causes the computer to determine a sum of frequencies of executing the call instruction to the callee function within the caller function, and to modify the code conditional upon the sum of the frequencies of executing the call instruction being greater than the sum of the frequencies of execution of call instructions to the caller function.

42. A product according to claim 41, wherein the software causes the computer to move the at least one of the store and restore instructions after determining that the non-volatile register is not used in the caller function.

43. A product according to claim 41, wherein the software causes the computer to locate an unused register in the caller function, and to modify the caller function to reference the unused register instead of the non-volatile register.

44. A product according to claim 41, wherein the software causes the computer to create a copy of the callee function, to remove the at least one of the store and restore instructions from the copy, and to modify the call instruction to reference the copy instead of the callee function.

45. A product according to claim 44, wherein the object code comprises a fixed sequence of code instructions ending with a last instruction, and the software causes the computer to add a copy of the callee function after the last instruction.

46. A product according to claim 44, wherein the software causes the computer to identify call instructions to the callee function located in a plurality of caller functions, and to select at least one of the plurality of caller functions to modify.

47. A product according to claim 46, wherein the software causes the computer to move the at least one of the store and restore instructions after determining that the non-volatile register is not used in the at least one of the plurality of caller functions that is selected.

48. A product according to claim 47, wherein the software causes the computer, for each one of the plurality of caller functions, to find any use of the at least one of the non-volatile register in the one of the plurality of caller functions, and to insert a store instruction before the call instruction and a restore instruction after the call instruction in the one of the plurality of caller functions.

49. A product according to claim 48, wherein the software causes the computer, if the use is not found, to add the at least one of the store and restore instructions to the one of the plurality of caller functions.

50. A product according to claim 41, wherein the callee function has an original name, and wherein the software causes the computer to remove the at least one of the store and restore instructions from the callee function and to rename the callee function with a new name, and to create an added function with the original name of the callee function, the added function comprising the at least one of the store and restore instructions removed from the callee function and a call to the callee function using the new name.

51. A product according to claim 50, wherein the object code comprises a fixed sequence of code instructions ending with a last instruction, and the software causes the computer to insert the added function after the last instruction.

52. A product according to claim 50, wherein the software causes the computer to identify call instructions to the callee function located in a plurality of caller functions, and to select at least one of the plurality of caller functions to modify.

53. A product according to claim 52, wherein the software causes the computer to move the at least one of the store and restore instructions after determining that the non-volatile register is not used in the at least one of the plurality of caller functions that is selected.

54. A product according to claim 53, wherein the software causes the computer, for each one of the plurality of caller functions, to find any use of the at least one of the non-volatile register in the one of the plurality of caller functions, and to insert a store instruction before the call instruction and a restore instruction after the call instruction in the one of the plurality of caller functions.

55. A product according to claim 54, wherein the software causes the computer, if the use is not found, to add the at least one of the store and restore instructions to the one of the plurality of caller functions.

56. A product according to claim 50, wherein a function comprises a name, and the software causes the computer to rename the callee function with a new name, and name the added function with the name of the callee function.

57. A product according to claim 41, wherein the software causes the computer to add the: at least one of the store and restore instructions to the caller function.

58. A product according to claim 57 wherein the caller function comprises a fixed sequence of code instructions, and the software causes the computer to modify the code without altering the fixed sequence.

59. A product according to claim 58, wherein the software causes the computer to replace an instruction in at least one of the prolog and epilog of the caller function with an unconditional branch to a caller function wrapper code, and wherein the caller function wrapper code comprises the instruction so replaced and the at least one of the store and restore instructions.

60. A product according to claim 41, wherein the software causes the computer to modify the code by recompiling the object code.

* * * * *